United States Patent
Tanaka, deceased et al.

[15] 3,642,257
[45] Feb. 15, 1972

[54] AGITATING APPARATUS

[72] Inventors: Masatami Tanaka, deceased, late of Machida-shi, Japan by Itsuko Tanaka, administratrix; Tadashi Hirotani, Tokyo, Japan

[73] Assignee: Kyowa Hakko Kogyo Co., Ltd., Tokyo, Japan by said Hirotani

[22] Filed: Mar. 5, 1969

[21] Appl. No.: 804,728

[52] U.S. Cl. ...................................................................261/93
[51] Int. Cl. ..........................................................B01f 3/04
[58] Field of Search......................................................261/93

[56] References Cited

UNITED STATES PATENTS

| | | | |
|---|---|---|---|
| 2,313,654 | 3/1943 | MacLean | 261/93 |
| 2,393,976 | 2/1946 | Daman et al. | 261/93 X |
| 2,521,396 | 9/1950 | Moul | 261/93 |
| 2,964,382 | 12/1960 | Hall, Jr. | 261/93 |
| 3,248,413 | 4/1966 | Motl | 261/93 |
| 3,278,170 | 10/1966 | Moritz | 261/93 X |
| 3,400,051 | 9/1968 | Hofschneider | 261/93 X |
| 3,409,130 | 11/1968 | Nakamura | 261/93 X |
| 3,420,370 | 1/1969 | Isenhardt et al. | 261/93 X |

*Primary Examiner*—Tim R. Miles
*Attorney*—Craig, Antonelli, Stewart & Hill

[57] ABSTRACT

The present disclosure is directed to an agitating assembly comprising a stationary lower guide plate means provided with a centrally disposed opening, the outer, peripheral portion of said lower guide plate means being canted upwardly and containing radially extending guide blades disposed on the upper side thereof, means for supporting the lower guide plate means, blade wheel means disposed immediately above the lower guide plate means, and agitating shaft means secured to the blade wheel means, said blade wheel means being rotatably disposed with respect to the stationary lower guide plate means. The present disclosure is also directed to the use of the agitating assembly in a fermentation tank.

6 Claims, 4 Drawing Figures

AGITATING APPARATUS

The present invention relates to an agitating assembly which is adapted for use in an aeration agitating tank containing a reaction liquid or a fermentation medium. More particularly, the present invention is directed to an agitating apparatus which provides good gas-liquid phase contact for conducting various types of reactions including fermentation processes.

In a gas-liquid reaction-type apparatus where a gas is blown into a liquid phase or in an apparatus which is used for culturing submerged aerobic micro organisms, various types of agitating blade assemblies such as turbines having about four to six flat blades, turbines having curved blades, disk turbines having bottom blades, and the like, have been employed. However, a fixed guide blade assembly has not been employed. When agitation is conducted with a flat blade turbine and a curved blade turbine but without the use of a bottom-covered guide blade assembly, it is necessary to conduct agitation using a large number of revolutions to obtain a sufficient contact of the gas-liquid phase, and the necessary rate of gas dissolution while providing uniformity of the liquid in the tank. Thus, when utilizing said turbines without a bottom-covered guide blade assembly, the power consumption which is required is much greater. When a bottom-blade disk turbine is employed without any bottom-covered guide blade assembly, the liquid discharged from a blade wheel is hardly made to follow a vertical circulating flow, and thus a substantial power consumption is required to obtain uniformity and evenness throughout the entire tank.

Also, a turbogas absorber is known which provides gas-liquid phase contact using a fixed guide blade assembly in a liquid-gas phase agitation system. However, in the turbogas absorber, the blade wheel is provided at a relatively high position in the tank, that is at a level in the middle of the liquid depth or even higher. Since the guide blade assembly is of the top-covered guide blade type, the liquid discharged from the blade wheel contains a large amount of bubbles, a substantial portion of which move upwards in direction while the gas discharged from the blade wheel travels toward and hits the tank wall. Consequently, the bubbles are not distributed in the liquid at the bottom portion of the tank. Furthermore, since the guide blade assembly is of the top-covered type, a shearing force develops between the blade wheel and guide blades and consequently the gas cannot be dissolved. Thus, the necessary rate of gas dissolution cannot be obtained with a small number of revolutions and with a small amount of power consumption. Under these circumstances, it has been necessary to develop a fixed guide blade assembly that allows a bubble-containing liquid discharged from a blade wheel to traverse the entire tank and provide a uniformity and evenness throughout the entire tank while developing a vigorous shearing force between the guide blades and the blade wheel to promote dissolution of the gas in the liquid phase.

An object of the present invention is to avoid the prior art disadvantages in the agitation of gas-liquid mixtures.

Another object of the present invention is to provide an improved agitating assembly for promoting gas-liquid contact reactions.

A further object of the present invention is to provide an improved agitating apparatus which utilizes a low power consumption, exhibits uniform agitation in a shorter mixing time and produces an improved yield of reaction product.

A still further object of the present invention is to provide an improved agitating apparatus which produces a high shearing effect to gas bubbles and promotes dissolution of the gas in a liquid phase.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, it has been found that the above-mentioned disadvantages may be eliminated and a much improved agitating assembly and agitating apparatus for promoting gas-liquid contact reactions may be obtained by providing an agitating assembly comprising a stationary lower guide plate means in cooperation with a blade wheel means, said agitating assembly giving a high shearing effect to gas bubbles with as little a power consumption as possible while distributing said bubbles uniformly throughout the reaction liquid to promote dissolution of the gas in the liquid phase.

The present invention will become more fully understood from the detailed description given hereinbelow and the accompanying drawings which are given by way of illustration only and thus are not limitative of the present invention and wherein, FIG. 1 shows the agitating apparatus of the present invention including an agitating tank utilizing the agitating assembly employed for gas-liquid contact according to the present invention;

Figure 1:
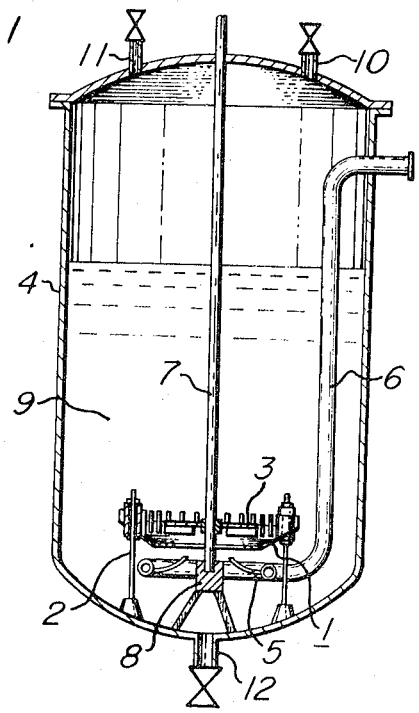

Referring now to the drawings wherein like reference numerals are used throughout the various views to designate like parts, the apparatus of the present invention comprises an aeration agitating tank 4 containing an agitating assembly comprising a bottom-covered guide blade assembly 1 and a blade wheel 3 disposed in the lower portion of the agitating tank. Said tank contains a reaction medium, for example a fermentation medium 9, disposed therein. The blade wheel 3 is rotated by an agitating shaft 7 supported by a bearing 8. Injection nozzles 5 are provided in the lower portion of the tank and function to inject a gas to the bottom side of the bottom-covered guide blade assembly 1. The injection nozzles 5 are in communication with an aeration pipe 6 which functions to introduce the gas to the injection nozzles. The bottom-covered guide blade assembly 1 is fixed to the bottom of the aeration agitating tank 4 outside the blade wheel 3 by means of supports 2. Inlet 10 provides a means for introducing the reaction liquid or the fermentation medium 9 into the reaction vessel, element 11 is a vent means for removing the unabsorbed, unreacted gas, and 12 is an outlet means for removing the reaction liquid or the fermentation medium from the tank.

Figure 2:
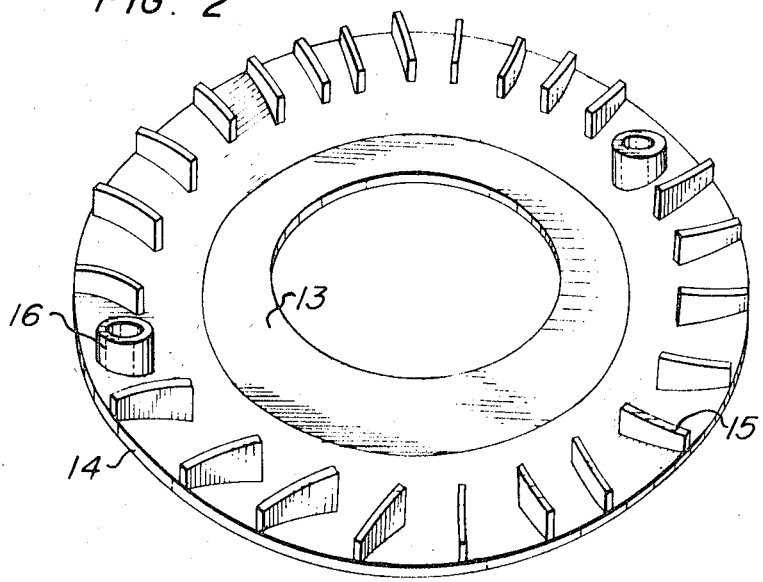
FIG. 2 is a schematic view of the bottom-covered guide blade assembly.
Figure 3:
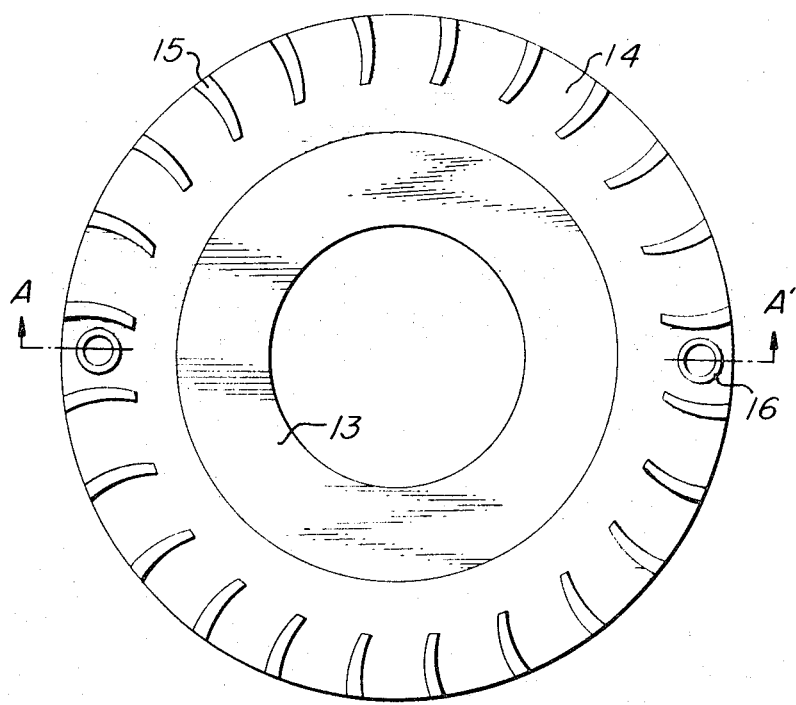
FIG. 3 is a plan view of the guide blade assembly of FIG. 2.
Figure 4:
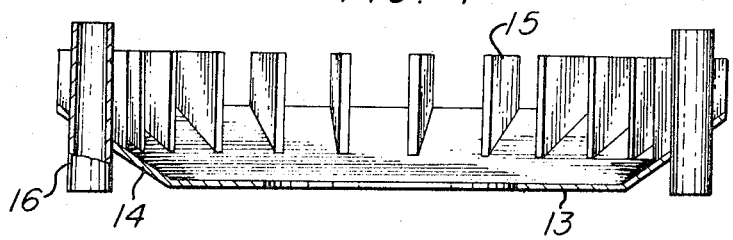
FIG. 4 is a cross-sectional view of FIG. 3 taken along the line A—A'.

Details of the bottom-covered guide blade assembly are shown in FIGS. 2, 3 and 4 wherein numeral 13 is a bottom-covering guide plate, 14 represents an upward guide plate and element 15 represents radial guide blades. The bottom-covered guide blade assembly is fixed to supports 2 by means of collars 16 for making the guide blade assembly stationary. Gas injected from the injection nozzles 5 passes upwards through a centrally disposed opening in the bottom-covering guide plate 13 of the bottom-covered guide blade assembly 1, and is agitated by the blade wheel 3. The bubbles created thereby are made finer by the vigorous shearing force developed between the blade wheel 3 and the fixed, stationary bottom-covering guide plate 13, whereby the gas is dissolved. The liquid containing the finer bubbles thus obtained is directed upwards by the upward extending guide plate 14, thereby building a vertical circulating flow which extends through the entire tank. The liquid discharged from the blade wheel is directed in the radial direction by radial guide blades 15 and said liquid moves upwards along the tank wall to obtain uniformity and evenness throughout the tank.

Table 1 shows the results obtained by measuring the sodium sulfite oxidation rate by charging 40 l. of a sodium sulfite solution into a 60 liter aeration agitation tank of 350 mm. inner diameter and passing 25 l. per minute of air therethrough. Table 2 shows values of power required for agitation, said values being obtained by charging the same liquid in the same aeration agitating tank and using a strain gauge.

TABLE 1

[Sodium sulfite oxidation rate, kg. a (kg.-mol/m.³, hr. atm.)]

| Number of revolution (r.p.m.) | 300 | 500 | 700 |
|---|---|---|---|
| Type of blade wheel and guide blade assembly: | | | |
| Bottom blade disk turbine | $1.185 \times 10^{-1}$ | $4.25 \times 10^{-1}$ | $6.75 \times 10^{-1}$ |
| Bottom blade disk turbine with bottom-covered guide blade assembly | $1.570 \times 10^{-1}$ | $5.00 \times 10^{-1}$ | $8.90 \times 10^{-1}$ |
| Flat blade turbine (6 blades) | $1.310 \times 10^{-1}$ | $4.63 \times 10^{-1}$ | $9.70 \times 10^{-1}$ |
| Flat blade turbine (6 blades) with bottom-covered guide blade assembly | $2.01 \times 10^{-1}$ | $7.65 \times 10^{-1}$ | $1.450$ |
| Turbo-gas absorber type | $5.60 \times 10^{-2}$ | $1.360 \times 10^{-1}$ | $4.18 \times 10^{-1}$ |
| Turbo-gas absorber type, whose guide blades are replaced with bottom-covered guide blade assembly | $9.15 \times 10^{-2}$ | $2.75 \times 10^{-1}$ | $7.15 \times 10^{-1}$ |

TABLE 2

[Power consumed for agitation, (kg. m./s.)]

| Number of revolution (r.p.m.) | 300 | 500 | 700 |
|---|---|---|---|
| Type of blade wheel and guide blade assembly: | | | |
| Bottom blade disk turbine | 0.65 | 2.95 | 10.74 |
| Bottom blade disk turbine with bottom-covered guide blade assembly | 0.67 | 3.02 | 10.50 |
| Flat blade turbine (6 blades) | 3.25 | 8.48 | 18.56 |
| Flat blade turbine (6 blades) with bottom-covered guide blade assembly | 3.20 | 8.45 | 19.02 |
| Turbo-gas absorber type | 0.563 | 2.28 | 8.10 |
| Turbo-gas absorber type, whose guide blades are replaced with bottom-covered guide blade assembly | 0.345 | 2.16 | 7.53 |

As shown in Tables 1 and 2, the power consumption is not changed very much at the same number of revolutions in the case of the bottom blade disk turbine and flat blade turbine (six blades), between that provided with a bottom-covered guide blade assembly and that not provided with said assembly, but the sodium sulfite oxidation rate becomes about 1.3 to about 1.6 times higher. When the guide blade assembly used in the turbogas absorber is replaced with a bottom-covered guide blade assembly and the latter is provided at the bottom of the tank as shown in FIG. 1, the power consumed for agitation is reduced by about 60 to 90 percent, as shown in FIG. 2, but the sodium sulfite oxidation rate becomes about 1.6 to 2 times higher.

The invention being thus described, it will be obvious that the same may be varied in many ways. Such variations are not to be regarded as a departure from the spirit and scope of the invention, and all such modifications as would be apparent to one skilled in the art are intended to be included.

It is claimed:

1. An agitating apparatus which comprises tank means, inlet means for introducing the material to be treated to said tank means, stationary lower guide plate means containing a centrally disposed opening and supported in the lower portion of the tank means, said lower guide plate means including a substantially horizontal central portion surrounding said opening and an outer peripheral portion surrounding said central portion and canted upwardly and containing curved guide blades extending generally radially adjacent their outer ends and disposed on the upper side thereof, blade wheel means disposed immediately above the lower guide plate means, agitating shaft means extending into the tank means and secured to the blade wheel means, said blade wheel means being rotatably disposed with respect to the stationary lower guide plate means, means associated with the agitation shaft for rotating the shaft and the blade wheel attached thereto, means for introducing a gaseous medium in the vicinity below the lower guide plate means and outlet means for removing the material being treated from the apparatus.

2. The apparatus of claim 1, wherein injection nozzle means disposed below the lower guide plate means in the vicinity of its centrally located opening are used for introducing the gaseous medium.

3. The apparatus of claim 2, wherein aeration pipe means communicate with said injection nozzle means.

4. The apparatus of claim 1, wherein the agitating shaft extends through the centrally disposed opening in the lower guide plate means and terminates in a bearing means supported in the lower portion of the tank means.

5. The apparatus of claim 1, wherein the peripheral portion of the lower guide plate means is provided with at least one collar means for receiving support means fixed to the bottom of the tank means.

6. The agitating apparatus of claim 1 wherein the central portion of the lower guide plate means is planar and the outer peripheral portion of the lower guide plate means forms an obtuse angle therewith.

* * * * *